(No Model.)

A. C. FLETCHER.
NUT LOCK.

No. 267,862.          Patented Nov. 21, 1882.

Witnesses.
Robert Everett,
George W. Rea

Inventor.
Addison C. Fletcher,
By James L. Norris.
Atty.

N. PETERS, Photo-Lithographer, Washington, D. C.

UNITED STATES PATENT OFFICE

ADDISON C. FLETCHER, OF NEW YORK, N. Y.

NUT-LOCK.

SPECIFICATION forming part of Letters Patent No. 267,862, dated November 21, 1882.

Application filed October 23, 1882. (No model.)

*To all whom it may concern:*

Be it known that I, ADDISON C. FLETCHER, a citizen of the United States, residing at New York, in the county and State of New York, have invented new and useful Improvements in Nut-Locks, of which the following is a specification.

This invention relates to improvements in the construction of that class of nut-locking devices wherein a polygonal-shaped block of rubber having a perforation is fixed in a cavity in the nut and is compressed by contact with a bar or plate to cause the edge of its perforation to come in contact with the thread of the bolt, thereby preventing the nut from rotating.

My invention consists of a block or washer of elastic material—such as india-rubber—having a central orifice or passage through it, the edge of which is provided with a series of inward-projecting transverse ribs or ridges which constitute independent bearings to come in contact with the threads on the bolt when the block or rubber is expanded by compression, incident to clamping it between the nut and the object to be secured by the bolt.

The invention further consists in a metal disk having a dished or concaved face to form a seat for the inner side or face of the elastic block or washer, and a nut having an annular cavity in one side to form a surrounding rim or flange, the inner surface of which bears against the periphery of the block or washer, and by the outward or radial expansion of the latter secures an interlock between the same and the nut, whereby the nut is effectually prevented from independently rotating, the dished or concaved face on the disk tending to expand the block or washer inward on the bolt around the inner edge of its perforation.

The invention comprises other features of construction and combination, which will be fully hereinafter described in detail, and pointed out in the claims.

Figure 1:
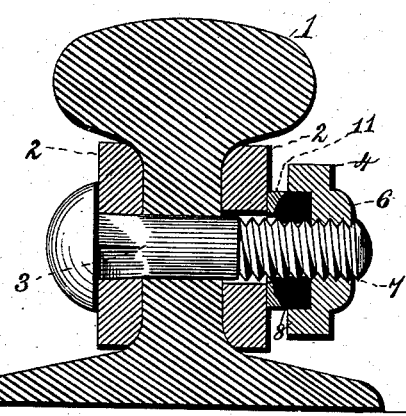
Figure 4:
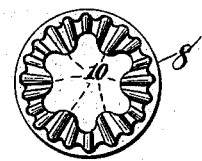
Figure 5:
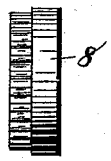
Figure 2:
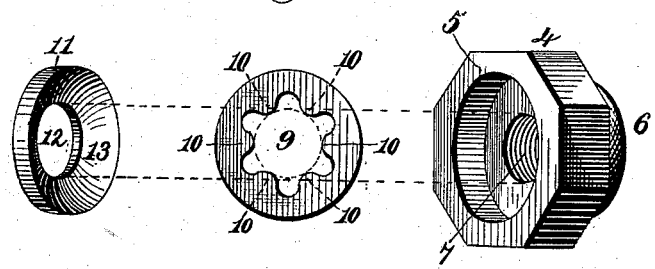
Figure 3:
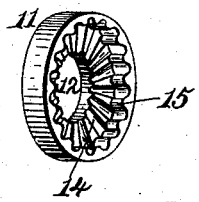

In the accompanying drawings, Figure 1 is a transverse sectional view of a railway-rail, showing the invention applied to lock the nut of one of the bolts which secure the fish-plates; Fig. 2, detached views of the nut, the elastic block or washer, and the disk forming a seat for the inner side of the latter; Fig. 3, a perspective view of a modified construction of disk, and Figs. 4 and 5 a modified construction of the elastic block or washer adapted to the form of disk shown in Fig. 3.

The rail 1, the fish-plates 2 2, and the screw-threaded bolt 3 are of the usual construction; but the nut 4 is formed by suitable dies, which produce an annular cavity in one side thereof to constitute the rim 5, the metal depressed to form the cavity being projected outward at the opposite side of the nut, thereby producing the thickened wall 6, through which is formed the threaded orifice 7 for screwing the nut upon the bolt. The elastic block or washer 8 is of rubber or similar material, and has a central opening, 9, through it, the edge of which is formed with a series of inward-projecting transverse ribs or ridges, 10, which constitute independent bearings to come in contact with and interlock with the threads of the bolt when the block or washer is compressed, as hereinafter explained. The periphery of the block or washer is of circular form to conform to the space of the inner annular surface of the rim 5 of the nut. The disk 11 is also circular, and has a passage, 12, by which to pass it over the bolt, one face being dished or concaved, as at 13, which forms the seat for one side of the block or washer.

In applying the devices to lock the nut the disk and block or washer are first passed over the bolt until the former rests against the fish-plate, after which the nut is screwed up, the rim thereof overlapping the periphery of the block or washer, the continued rotation of the nut compressing the block or washer between it and the disk, causing inward as well as outward expansion, thereby causing the independent bearings or ribs or ridges to come in contact and interlock with the threads of the bolt, at the same time binding the periphery of the block or washer against the inner surface of the rim on the nut. The concave seat on the disk also tends to expand the block or washer inward on the threads, thereby materially increasing the efficient interlock of the bearings or ribs and the threads, and in this manner the block or washer is held in a fixed position, and by the frictional contact of its periphery with the rim of the nut the latter is effectually prevented from rotating and thereby becoming loose. The elastic nature of the block or washer also compensates for longitudinal expansion and contraction of the bolt.

To secure an interlock between the elastic block or washer and the disk on which it seats, I construct the disk of a dished shape by means of a depression in one side, as shown in Fig. 3, the walls 14 and 15 of which are provided with grooves or recesses to form projecting ledges or ribs. By dishing the disk the block or washer can enter therein and its edges be protected, so that when all the parts are in position the block or washer is entirely covered and concealed.

While I have shown and described my invention as applied to lock the nuts of bolts used in securing the fish-plates of railway-rails, it is obvious that the devices can be used in any place where a nut and bolt are used to attach objects and it is desirable to prevent the nut from becoming loose, which usually results from jarring and jolting incident to rolling-stock or the vibrations of working machinery.

What I claim is—

1. An elastic block or washer having an orifice through it, the edge of which is provided with a series of inward-projecting ribs or ridges, which constitute independent bearings to come in contact with the threads of a bolt when expanded by the action of the nut, substantially as described.

2. The combination of a threaded bolt, the nut having the rim or flange, and the elastic block or washer having an orifice through it, the edge of which is provided with a series of inward-projecting ribs or ridges, which constitute bearings to come in contact with the threads of the bolt when expanded, substantially as described.

3. The combination of a threaded bolt, a dished disk, a nut having a rim, and an elastic block or washer adapted to seat on the disk, and having an orifice through it, the edge of which is provided with a series of inward-projecting ribs or ridges, substantially as described.

In testimony whereof I have hereunto set my hand in the presence of two subscribing witnesses.

ADDISON C. FLETCHER.

Witnesses:
JAMES L. NORRIS,
JAMES A. RUTHERFORD.